United States Patent [19]

Procter

[11] 4,229,391

[45] Oct. 21, 1980

[54] PROCESS FOR THE MANUFACTURING OF COLORED CLAY PRODUCTS

[75] Inventor: James W. Procter, Southport, England

[73] Assignee: Ravenhead Brick Company Limited, Tyne and Ware, England

[21] Appl. No.: 862,788

[22] Filed: Dec. 21, 1977

[30] Foreign Application Priority Data

Dec. 22, 1976 [GB] United Kingdom ............... 53596/76

[51] Int. Cl.$^2$ ............................................. C04B 35/56
[52] U.S. Cl. ..................................... 264/29.5; 106/56; 106/67; 264/29.6; 264/29.7; 264/65; 264/66
[58] Field of Search ................. 264/82, 29.1, 65, 29.5, 264/29.6, 29.7, 66; 106/67, 56

[56] References Cited

U.S. PATENT DOCUMENTS

| | | | |
|---|---|---|---|
| 2,929,126 | 3/1960 | Bollack et al. | 264/65 |
| 3,330,333 | 7/1967 | Metz | 264/65 |
| 3,462,522 | 8/1969 | Clark et al. | 264/82 |
| 3,487,136 | 12/1969 | Bonner et al. | 264/82 |
| 4,004,934 | 1/1977 | Prochazka | 264/65 |
| 4,069,060 | 1/1978 | Hayashi et al. | 264/65 |
| 4,093,688 | 6/1978 | Withop et al. | 264/65 |

*Primary Examiner*—Donald J. Arnold
*Attorney, Agent, or Firm*—Beveridge, DeGrandi, Kline & Lunsford

[57] ABSTRACT

The present invention relates to a process for the production of colored, fired, shaped clay products which comprises firing shaped, dried clay objects in a kiln, effecting carbon deposition on and into the resulting fired clay objects by heat treating the said fired objects in a carburizing atmosphere to produce a colored, fired, shaped clay product and thereafter cooling said colored product in an atmosphere of nitrogen.

15 Claims, No Drawings

PROCESS FOR THE MANUFACTURING OF COLORED CLAY PRODUCTS

The present invention relates to the manufacture of coloured, fired clay products, especially those having a blue-grey to grey colour.

"Blue bricks" are so called because they have a grey-blue colour caused by the presence of $Fe_3O_4$. Such bricks are manufactured in the conventional manner except that the $Fe_2O_3$ in the clay is first oxidised to FeO (red) and this is then reduced to $Fe_3O_4$ (black) by prolonged exposure to a reducing atmosphere at a temperature of 1150° to 1200° C. The high temperature is necessary to produce a stable $Fe_3O_4$. In order to avoid reoxidation of the $Fe_3O_4$, cooling of the bricks is usually carried out in a closed kiln over a period of about 10 days. Not many types of clay are suitable for this process since there must be sufficient iron present (i.e., more than 8% by weight) to produce a sufficient depth of colour and the clay must also be able to withstand the high temperatures necessary under commercial production where the bricks are in stacks of 60 or more high. It is an object of the present invention to provide a process for the production of blue-grey to grey coloured, fired clay products which enables a wide variety of clays to be used regardless of their iron content.

It is a further object of the invention to provide such a process in which clays which cannot withstand temperatures necessary to produce a stable $Fe_3O_4$ (i.e., 1150° to 1200° C.) can be used.

It is a still further object to provide such a process in which the time required to produce the requisite colour is substantially reduced.

Another object is to provide such a process in which the cooling time is substantially reduced.

According to the present invention these objects are achieved by providing a process for the production of coloured, fired clay products which comprises firing shaped, dried, clay products in a kiln effecting carbon deposition on and in the fired products by heat treating the products under a carburizing atmosphere and cooling the heat treated products under an atmosphere of nitrogen.

The temperature during the carburizing step should be as high as possible consistent with the clay used. Thus it is preferable to carburize at the maximum temperature which the clay will withstand under commercial production conditions. The duration of the carburization step can be from 2 to 12 hours depending on the effect required and the depth of penetration of carbon into the brick which is deemed desirable. The longer the period of carburization the deeper the penetration of carbon into the fired clay product. Cooling under a nitrogen atmosphere need only be effected as far as about 350° C. At this temperature the kiln can be opened and the resulting products exposed to air without endangering a loss of colour. If the clay has a high silica content then the cooling should be carried out such that over the temperature range 600° to 500° C. i.e., over the phase change which occurs in the silica at approximately this temperature range should be effected in a time sufficient to prevent any damage to the products. Usually it is necessary to prolong the cooling over this temperature range to about 10 hours. For comparatively low silica content clays this precaution is not necessary. For low silica content clays the cooling can generally be effected with nitrogen recycling via a heat exchanger in about 36 hours. Where a high silica clay is present cooling can be effected in about 48 hours. These periods compare very favourably with the conventional period of about 10 days for cooling "blue bricks".

Whilst carburization is preferably effected at the highest temperature consistent with the clay starting material, lower temperatures may be used if desired. The higher the temperature at which carburization is effected the stronger the bonding of the deposited carbon in and to the clay material. If lower temperatures are used for effecting carburization then there is a saving in fuel and thereby in costs, but there is a reduction in the strength of the bond of the carbon in and to the clay material.

It has further been surprisingly found that if a small quantity of oxygen is admixed with the nitrogen used during the cooling of the carburized, fired, shaped clay products a speckled effect is produced on the products. The speckling effect is not uniform throughout the products, but varies from one to another. The aesthetic qualities of such speckled products are considered to be good and desireable. The amount of oxygen used should not be such as to remove too much colour from the bricks, but should be enough to produce the desired speckled effect. About 5% of oxygen in admixture with the nitrogen has been found to be effective.

If the process of the present invention is applied to fired clays produced from starting materials which have more than 8% iron and which can withstand temperatures during firing and carburization of 1150° to 1200° C. then it is found that the depth of colour can be achieved in a shorter period of time than is possible with the conventional process and furthermore the overall time of the process is materially reduced. Furthermore it is still possible to produce the speckled effect referred to above by introducing a small quantity of oxygen into the nitrogen atmosphere during the cooling period.

The invention will now be further illustrated by the following examples.

EXAMPLE 1

A clay having an iron content of 6% by weight is pre-treated in a conventional manner. The clay is first ground into fine particles, preferably having a maximum diameter of about 3 mm. Water is mixed in with the clay and the mixture extruded. The extruded clay is cut into brick form by means of a wire. The clay bricks are then dried at about 200° C.

The dried bricks are then placed in a shuttle kiln for firing. The kiln is heated by burners, which use fuel such as natural gas, butane and the like, up to a temperature of about 600° C. over a period of about 15 hours after which oxygen is introduced to the kiln over a period of about 20 hours. The oxygen is preferably introduced to the kiln via the burner ports at a point spaced from the flame so that the introduced oxygen is not used in the combustion process. The heat turbulence will ensure that the oxygen is circulated throughout the kiln. In the particular kiln used in this example, the oxygen is introduced at 27 burner ports and in each case at a distance of about 5 cm from the flame. During this time the temperature of the kiln is raised to about 950° C. This effectively completes the firing of the bricks.

At this point a carburizing atmosphere is produced in the kiln by excluding air from the kiln thus causing a fuel rich flame which reduces CO to carbon. Under this atmosphere the bricks are heated up to a temperature of about 1000° C. The temperature is maintained at 1000° C. for about 3 hours. If the clay will withstand higher temperatures this heat treatment can be carried out at a higher temperature over a shorter period of time or at a lower temperature over a longer period of time.

Just prior to the end of the heat treatment with a carburizing atmosphere nitrogen is introduced into the kiln. When the nitrogen has completely replaced the original atmosphere the burners are shut off and cooling of the kiln is then commenced. The nitrogen is recirculated via a cooling apparatus which may be a heat exchanger and also from time to time fresh nitrogen is introduced to the kiln. The bricks are cooled to a temperature of about 350° C. in an atmosphere of nitrogen over a period of about 36 hours. Since the silica content of the particular clay used in this example was low it was not necessary to take precautions over the temperature range 600° C. down to 500° C. The bricks were cooled in the conventional manner from 350° C. downward to ambient temperature, i.e., in an atmosphere of air.

The resultant bricks have the characteristic blue colour of the so-called "blue bricks".

EXAMPLE 2

A keuper marl type clay containing 8% iron no carbon and approximately 5% volatile manner and having a fairly low silica content was used. This clay is incapable of withstanding temperatures of 1150° C. under production conditions. The procedure of Example 1 was repeated except that the clay was fired by raising the temperature at a rate of 20° C. per hour to a final temperature of 1010° C. This temperature was maintained during the introduction of a carburizing atmosphere and the duration of the carburizing treatment was 5 hours instead of 3.

The resultant bricks have the characteristic blue colour of the so-called "blue bricks".

EXAMPLE 3

The shale of Example 1 was admixed with a fireclay having a content of substantially 3% iron by weight to give a mixture having an average iron content of 4.5 to 5% by weight. This mixture was subjected to the process of Example 1 with the following modification:

After the nitrogen introduction and when the temperature had dropped to 920° C., air was introduced into the recirculating nitrogen until the oxygen content of the atmosphere of the kiln reached 5% by weight. The air introduction was stopped at this point and the kiln cooled with recirculation of the temperature for 45 minutes. The kiln atmosphere was then replaced with fresh nitrogen and cooling continued as in Example 1 under nitrogen alone recirculation of the nitrogen being continued until the temperature dropped to 350° C.

The resultant bricks had a speckled effect.

The method of the invention enables a wide variety of clay materials to be used since it does not rely on the production of a stable $Fe_3O_4$. The nitrogen atmosphere during cooling has been found to be essential since if after carburization the kiln is merely closed to the atmosphere and allowed to cool in the conventional manner the colour produced by the carburizing either disappears or is so markedly reduced as to be unsatisfactory.

We claim:

1. A process for the production of colored, fired, shaped clay products which comprises firing shaped, dried, iron-containing clay objects in a kiln, depositing carbon on and into the resulting fired clay objects by heat treating the said fired objects in a carbon-containing atmosphere to produce a colored, fired, shaped clay product and thereafter cooling said colored product in an atmosphere of nitrogen to prevent loss or reduction of the color produced by the carbon deposition step.

2. A process as claimed in claim 1 in which the iron content of the clay material used in the production of the product is less than 8% by weight.

3. A process as claimed in claim 1 in which the clay material used in the production of the product is one for which the maximum permissable temperature to which the clay can be heated during commercial production in a kiln is less than 1150° C.

4. A process as claimed in claim 1 in which the fired clay objects are subjected to the heat treatment in a carbon-containing atmosphere for a period of from 2 to 12 hours.

5. A process as claimed in claim 1 in which the cooling of the coloured product in an atmosphere of nitrogen is effected in less than 50 hours.

6. A process as claimed in claim 5 in which the nitrogen is recirculated in and out of the kiln holding the coloured product being cooled via a heat exchanger.

7. A process for the production of colored, fired, shaped clay products which comprises firing shaped, dried, iron-containing clay objects in a kiln, depositing carbon on and into the resulting fired clay objects by heat treating the said fired objects in a carbon-containing atmosphere to produce a colored, fired, shaped clay product and thereafter cooling said colored product in an atmosphere of nitrogen to prevent the loss or reduction of the color produced by the carbon deposition step, said nitrogen atmosphere containing a small amount of oxygen in quantities and for times to cause a speckled effect in the final colored product.

8. A process as claimed in claim 7 in which the amount of oxygen is substantially 5% by weight of the atmosphere in the kiln and in which the duration of the exposure is substantially 45 minutes.

9. A process as claimed in claim 1 in which the colored, fired, shaped clay products are bricks.

10. A process as claimed in claim 7 in which the colored, fired, shaped clay products are bricks.

11. A process for the production of colored, fired, shaped clay products which comprises firing shaped, dried, iron-containing clay objects in a kiln, depositing carbon on and into the resultant fired clay objects by exposing the said fired clay objects to the action of a carbon-containing atmosphere at an elevated temperature for a period of from 2 through 12 hours to produce colored, fired, shaped clay products and thereafter cooling the resulting colored, fired, shaped clay products in an atmosphere of nitrogen to prevent the loss or reduction of the color produced by the carbon deposition step, and recirculating the nitrogen via a heat exchanger during the cooling period.

12. A process as claimed in claim 11 in which the deposition of carbon on and into the fired clay objects is effected at about the maximum temperature which the clay objects will withstand under commercial operating conditions in a kiln.

13. A process as claimed in claim 11 in which the temperature at which carbon is deposited on and into the fired clay objects is in the range of from 950° C. to 1050° C.

14. A process as claimed in claim 11 in which the clay has an iron content of less than 8% by weight.

15. A process as claimed in claim 11 in which the colored, fired, shaped clay products are bricks.

* * * * *